United States Patent
Hung

(10) Patent No.: US 9,232,213 B2
(45) Date of Patent: Jan. 5, 2016

(54) STEREO IMAGE OUTPUT APPARATUS AND ASSOCIATED METHOD

(71) Applicant: MStar Semiconductor, Inc., Hsinchu Hsien (TW)

(72) Inventor: Shih-Han Hung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 343 days.

(21) Appl. No.: 13/909,225

(22) Filed: Jun. 4, 2013

(65) Prior Publication Data

US 2014/0043449 A1 Feb. 13, 2014

(30) Foreign Application Priority Data

Aug. 10, 2012 (TW) .............................. 101128961 A

(51) Int. Cl.
*H04N 13/04* (2006.01)
*H04N 5/92* (2006.01)
*H04N 13/00* (2006.01)

(52) U.S. Cl.
CPC ....... *H04N 13/0497* (2013.01); *H04N 13/0051* (2013.01); *H04N 13/0048* (2013.01); *H04N 13/0055* (2013.01)

(58) Field of Classification Search
CPC ............ H04N 13/0497; H04N 13/004; H04N 21/4307; H04N 13/0051
See application file for complete search history.

(56) References Cited

U.S. PATENT DOCUMENTS

| | | | | |
|---|---|---|---|---|
| 8,884,952 | B2* | 11/2014 | Kim ....................... | G06T 15/00 345/418 |
| 2011/0141235 | A1* | 6/2011 | Tsukagoshi .......... | H04N 13/007 348/43 |
| 2012/0128327 | A1* | 5/2012 | Matsubara ........... | H04N 9/8227 386/244 |
| 2013/0009951 | A1* | 1/2013 | Kwon .................. | H04N 13/026 345/419 |

FOREIGN PATENT DOCUMENTS

| CN | 102197655 | 9/2011 |
|---|---|---|
| CN | 102427544 | 4/2012 |

OTHER PUBLICATIONS

Taiwan Patent Office, "Office Action," May 8, 2015.

* cited by examiner

*Primary Examiner* — Dave Czekaj
*Assistant Examiner* — Tsion B Owens
(74) *Attorney, Agent, or Firm* — WPAT, PC; Justin King

(57) ABSTRACT

A stereo image output method includes: providing a request command; outputting current image frame information from a storage unit in response to the request command, and triggering an image synchronization operation to update the image frame information in the storage unit; and outputting a set of stereo images from a memory according to the image frame information.

13 Claims, 4 Drawing Sheets

STEREO IMAGE OUTPUT APPARATUS AND ASSOCIATED METHOD

This application claims the benefit of Taiwan application Serial No. 101128961, filed Aug. 10, 2012, the subject matter of which is incorporated herein by reference.

BACKGROUND OF THE INVENTION

1. Field of the Invention

The invention relates in general to a stereo image output apparatus, and more particularly to a stereo image output apparatus and associated method capable of outputting synchronized stereo images within a limited time period.

2. Description of the Related Art

When rendering stereo images in the prior art, an image output unit typically sends a request command to a control unit during a constant time interval in order to retrieve information of required left-eye image frame information and right-eye image frame information. Upon receiving the request command, the control unit first synchronizes the left-eye frame and the right-eye image, and outputs a synchronized result and information associated with the left-eye frame and the right-eye frame to the image output unit. If the time consumed by the synchronization operation on the left-eye frame and the right-eye frame becomes too long, the current procedure is considered erroneous, and the image output unit sends a black frame to a rear-end display device, on which the black frame is displayed. When this happens, a display flaw results The current invention relates to eliminating display errors during the rendering of stereo images on a suitable display.

SUMMARY OF THE INVENTION

The invention is directed to a stereo image output apparatus and associated method, which is capable of outputting information of synchronized left-eye frame and right-eye frame within a limited time period for solving the above issue.

According to an embodiment of the present invention, a stereo image output method comprises: providing a request command; outputting image frame information from a storage unit in response to the request command, and triggering an image synchronization operation to update the image frame information in the storage unit; and outputting a set of stereo images from a memory according to the image frame information.

According to another embodiment of the present invention, a stereo image output apparatus comprises a storage unit, an image output unit, an information transmission unit, and an image synchronization unit. The image output unit provides a request command. The information transmission unit outputs image frame information from the storage unit in response to the request command, and triggers an image synchronization operation to update the image frame information in the storage unit. The image synchronization unit performs the image synchronization operation. The image output unit further outputs a set of stereo images from a memory according to the outputted image frame information.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
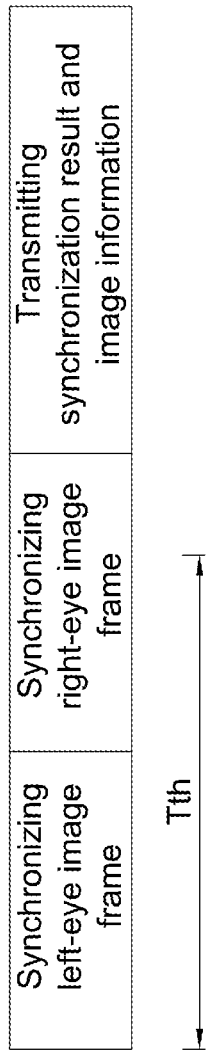
FIG. 1 is a timing diagram of operations when playing stereo images.

FIG. 1 shows a timing diagram of various operations when playing stereo images. As shown in FIG. 1, when playing stereo images, an image output unit sends a request command to obtain required information of a left-eye frame and a right-eye frame. More specifically, a synchronization operation is performed on multiple left-eye frames and multiple right-eye frames in a storage unit to determine the left-eye frame and the right-eye frame required by the image output unit. After completing the synchronization operation, a synchronization complete notification and the information of the determined left-eye frame and right-eye frame are then transmitted back to the image output unit. In general, the synchronization operation needs to be completed within a limited period Tth in order to prevent errors.

Figure 2:
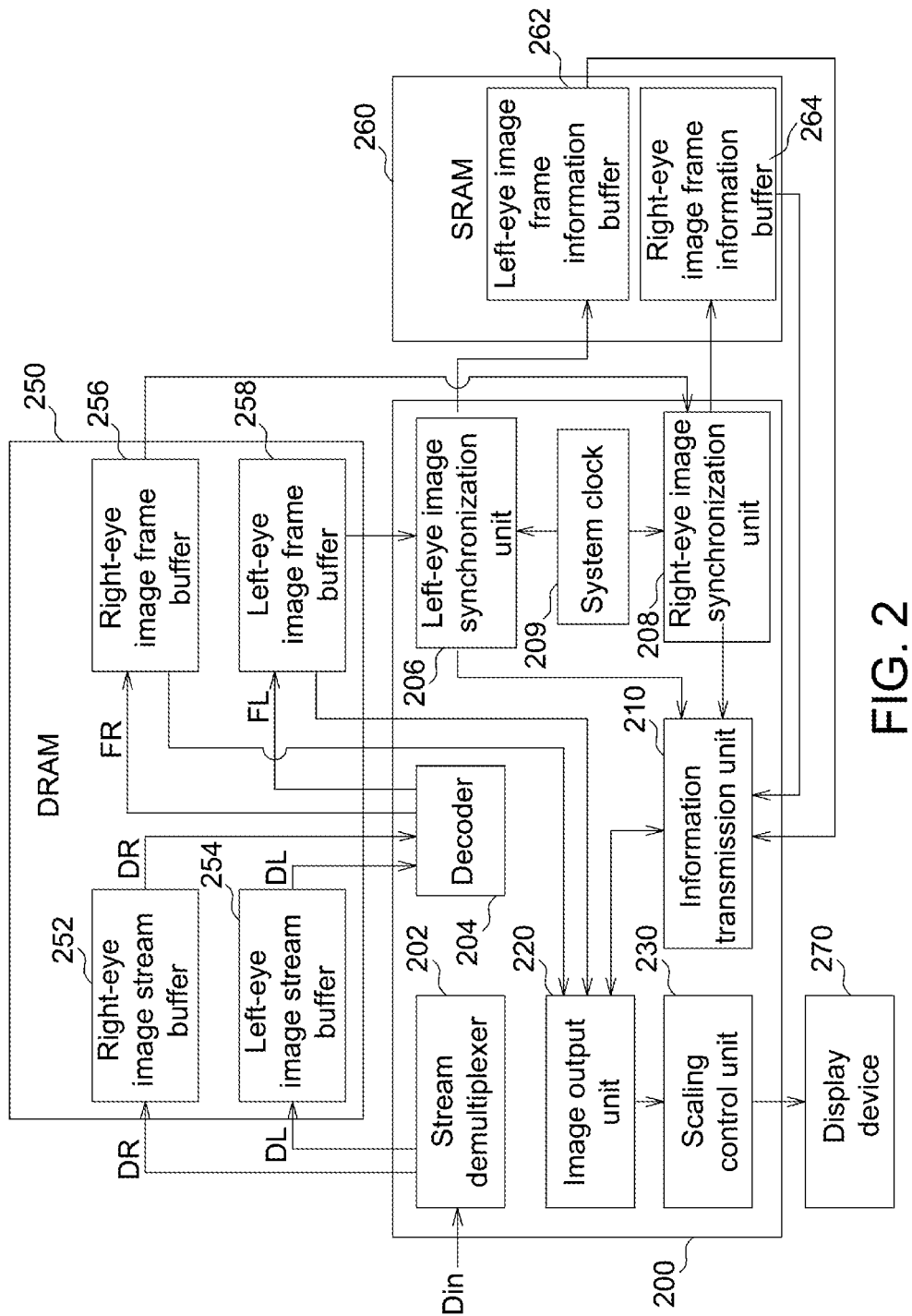
FIG. 2 is a schematic diagram of a stereo image output apparatus according to an embodiment of the present invention.

FIG. 2 shows a schematic diagram of a stereo image output apparatus 200 according to an embodiment of the present invention. Referring to FIG. 2, the stereo image output apparatus 200 comprises a stream demultiplexer 202, a decoder 204, an image synchronization unit (comprising a left-eye image synchronization unit 206 and a right-eye image synchronization unit 208 in the embodiment), a system clock 209, an information transmission unit 210, an image output unit 220, and a scaling control unit 230. The stereo image output apparatus 200 is coupled to a memory (e.g., a dynamic random access memory (DRAM) 250 in the embodiment), a storage unit (e.g., a static random access memory (SRAM) 260 in the embodiment), and a display device 270. The DRAM 250 comprises a right-eye image stream buffer 252, a left-eye image stream buffer 254, a right-eye image frame buffer 256, and a left-eye image frame buffer 258. The SRAM 260 comprises a left-eye image frame information buffer 262 and a right-eye image frame information buffer 264. Further, in the embodiment, for example, the stereo image output apparatus 200 is implemented by a single chip. In an alternative embodiment, the DRAM 250 and the SRAM 260 may be implemented by other types of storage devices, either locally or remotely located to the stereo image output apparatus 200.

When operating the stereo image output apparatus 200, the stream demultiplexer 202 first receives a stream Din from outside the chip, and transmits a right-eye image stream DR in the stream Din to the right-eye stream buffer 252 and a left-eye image stream DL to the left-eye image stream buffer 254. The decoder 204 accesses and decodes the right-eye image stream DR from the right-eye image stream buffer 252 to obtain a plurality of right-eye image frames FR, and stores the right-eye image frames FR to the right-eye image frame buffer 256. Similarly, the decoder 204 also accesses and decodes the left-eye image stream DL from the left-eye image stream buffer 254 to obtain a plurality of left-eye image frames FL, and stores the left-eye image frames FL to the left-eye image frame buffer 258.

The image output unit 220 sends a request command to the information transmission unit 210. The request command requests the information transmission unit 210 to send the information of a left-eye image frame and a right-eye image frame to the image output unit 220. When the image output unit 220 sends the request command for the $N^{th}$ time, the request command corresponds to the $N^{th}$ frame, indicating that the image output unit 220 requires the $N^{th}$ right-eye image frame and the $N^{th}$ left-eye image frame obtained from decoding the right-eye image stream DR and the left-eye image stream DL, respectively. Assuming that the image output unit 220 requires the first right-eye image frame obtained from decoding the right-eye image stream DR and the first left-eye image frame obtained from decoding the left-eye image stream DL, the information transmission unit 210 notifies the left-eye image synchronization unit 206 and the right-eye image synchronization unit 208 to perform a synchronization operation to identify the first right-eye image frame and the first left-eye image frame from the right-eye image frame buffer 256 and the left-eye image frame buffer 258, respectively. More specifically, in the synchronization operation, the left-eye image synchronization unit 206 compares time information (i.e., a time stamp) carried by the left-eye image frames in the left-eye image frame buffer 258 according to the system clock 209 to identify the left-eye image frame having closest time information, and stores information, e.g., a brightness data address, a chroma data address and an image resolution, of the left-eye image frame in the left-eye image frame buffer 258 to the left-eye image frame information buffer 262. Similarly, the right-eye image synchronization unit 208 compares time information (i.e., a time stamp) carried by the right-eye image frames in the right-eye image frame buffer 256 according to the system clock 209 to identify the right-eye image frame having closest time information, and stores information, e.g., a brightness data address, a chroma data address, and an image resolution, of the right-eye image frame in the right-eye image frame buffer 256 to the right-eye image frame information buffer 264.

In the embodiment, after the information transmission unit 210 determines the information of the first right-eye image frame and the first left-eye image frame, the information transmission unit 210 does not transmit any synchronization result (synchronization complete notification) or the information of the image frames to the image output unit 220. Thus, as the image output unit 220 does not receive any synchronization result (synchronization complete notification), the image output unit 220 outputs a black frame to the scaling control unit 230 and the display device 270.

Next, the image output unit 220 sends a next request command to the information transmission unit 210 to request information of the second left-eye image frame and the second right-eye image frame. At this point, the information transmission unit 210 sends the synchronization result (synchronization complete notification), the first left-eye image frame information stored in the left-eye image frame information buffer 262 and the first right-eye image frame information stored in the right-eye image frame information buffer 264 to the image output unit 220. The information transmission unit 210 further triggers the left-eye image synchronization unit 206 to again compare the time information carried in the left-eye image frames in the left-eye image frame buffer 258 according to the system clock 209 to identify the second left-eye image frame, and stores the information of the left-eye image frame to the left-eye image frame information buffer 262 to update the image frame information in the left-eye image frame information buffer 262. Similarly, the information transmission unit 210 further triggers the right-eye image synchronization unit 208 to again compare the time information carried in the right-eye image frames in the right-eye image frame buffer 256 according to the system clock 209 to identify the second right-eye image frame, and stores the information of the right-eye image frame to the right-eye image frame information buffer 264 to update the image frame information in the right-eye image frame information buffer 264.

As previously described, the information transmission unit 210 immediately transmits the synchronization result (synchronization complete notification), the first left-eye image frame information, and the first right-eye image frame information to the image output unit 220, and so the image output unit 220 is allowed to immediately identify the first left-eye image frame and the first right-eye image frame from the left-eye image frame buffer 258 and the right-eye image frame buffer 256 according to the received first left-eye image frame information and first right-eye image frame information, respectively.

After the image output unit 220 respectively identifies the first left-eye image frame and the first right-eye image frame from the left-eye image frame buffer 258 and the right-eye image frame buffer 256, the image output unit 220 converts a format of the first left-eye image frame and the first right-eye image frame, and sends the format converted first left-eye image frame and right-eye image frame to the scaling control unit 230. After scaling the format converted first left-eye image frame and first right-eye image frame, the scaling control unit 230 transmits the scaled first left-eye image frame and first right-eye image frame to the display device 270 for display. Wherein, the image output unit 220 converts a data format of the first left-eye image frame and the first right-eye image frame to a data format required by the scaling control unit 230.

Similarly, after the image output unit 220 sends a next request command to the information transmission unit 210 to request information of the third left-eye image frame and the third right-eye image frame, the information transmission unit 210 immediately sends the synchronization result (synchronization complete notification), the second left-eye image frame information stored in the left-eye image frame information buffer 262, and the second right-eye image frame information stored in the right-eye image frame information buffer 264 to the image output unit 220. Thus, the image output unit 220 is allowed to immediately obtain the second left-eye image frame and the second left-eye image frame from the left-eye image frame buffer 258 and the right-eye image frame buffer 256, respectively.

Figure 3:
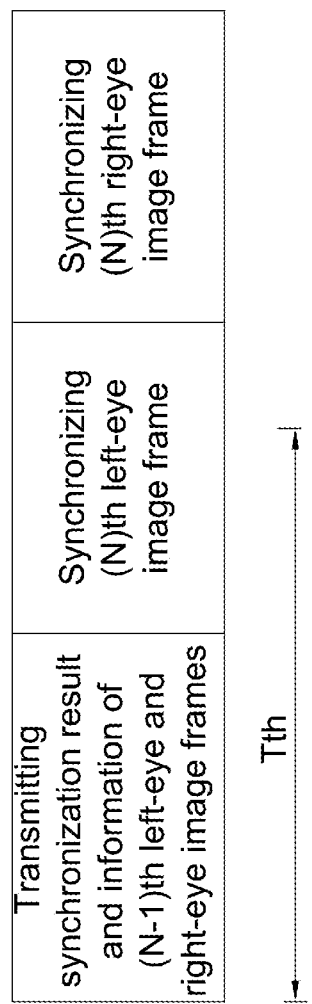
FIG. 3 is a schematic diagram of operations of the stereo image output apparatus in FIG. 2.

As previously described, when the image output unit 220 sends a request command to the information transmission unit 210 to request for information of the $N^{th}$ left-eye image frame and the $N^{th}$ right-eye image frame, the information transmission unit 210 immediately transmits the synchronization result (synchronization complete notification), information of the $(N-1)^{th}$ left-eye image frame stored in the left-eye image frame information buffer 262 and information of the $(N-1)^{th}$ right-eye image frame stored in the right-eye image frame information buffer 264 to the image output unit 220. As such, the image output unit 220 is allowed to immediately obtain the $(N-1)^{th}$ left-eye image frame and the $(N-1)^{th}$ right-eye image frame from the left-eye image frame buffer 258 and the right-eye image frame buffer 256. Referring to FIG. 3 for a concept of the above operations, FIG. 3 shows a schematic diagram of operations of the stereo image output apparatus 200. When playing stereo images, the image output unit 220 sends a request command to obtain information of the required left-eye image frame and right-eye image frame. As previously described, since the image output unit 220 is able to receive the synchronization complete notification within the limited time period Tth, it is ensured that the left-eye image synchronization unit 206 and the left-eye image synchronization unit 208 are capable of in time completing the synchronization operation to prevent errors. Thus, an issue of the image output unit 220 outputting a black frame due to the errors can be avoided to remarkably improve image quality.

Figure 4:
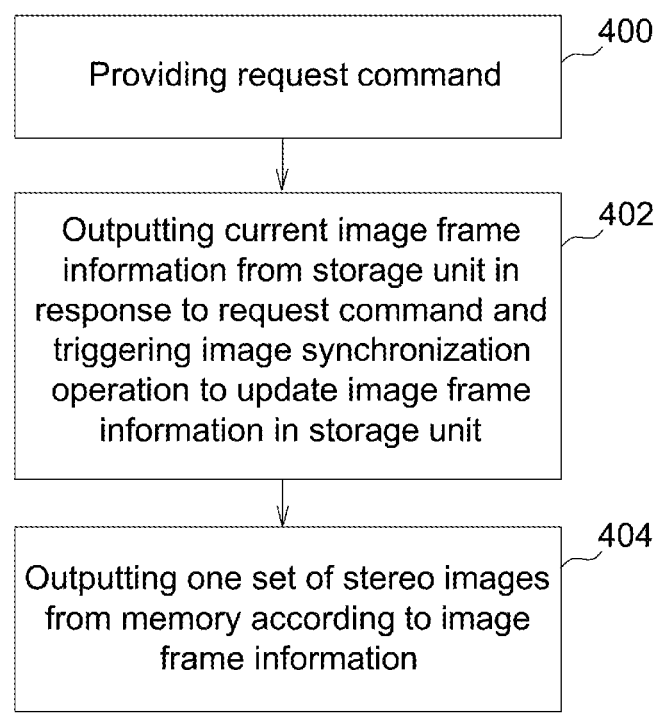
FIG. 4 is a flowchart of a stereo image output method according to an embodiment of the present invention.

FIG. 4 shows a flowchart of a stereo image output method according to an embodiment of the present invention. Also referring to descriptions associated with FIG. 2, the stereo image output method according to an embodiment comprises the following steps.

In step 400, a request command is provided.

In step 402, current image frame information is outputted from a storage unit in response to the request command, and an image synchronization operation is triggered to update the image frame information in the storage unit.

In step 404, a set of stereo images are outputted from a memory according to the image frame information.

In conclusion, in the stereo image output apparatus and associated method, after the image output unit 220 sends a request command to the information transmission unit 210, the information transmission unit 210 immediately sends the synchronization result, the previous left-eye image frame information and the previous right-eye image frame information to the image output unit 220. As such, it is ensured that the left-eye image synchronization unit 206 and the right-eye image synchronization unit 208 are capable of in time completing the synchronization operation to prevent errors. Thus, an issue of the image output unit 220 outputting a black frame due to the errors can be avoided to remarkably improve image quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A stereo image output method, comprising:
   providing a first request command at a first time point, wherein the first request command corresponds to a second set of stereo images;
   outputting image frame information from a storage unit in response to the first request command, wherein the image frame information comprises memory addresses of a first set of stereo images stored in a memory;
   triggering an image synchronization operation to update the image frame information in the storage unit according to the first request command;
   outputting the first set of stereo images from the memory according to the outputted image frame information;
   providing a second request command at a second time point, wherein the second request command corresponds to a third set of stereo images;
   outputting the updated image frame information from the storage unit in response to the second request command, wherein the updated image frame information comprises memory addresses of the second set of stereo images stored in a memory; and
   outputting the second set of stereo images from the memory according to the outputted updated image frame information.

2. The stereo image output method according to claim 1, wherein the first request command corresponds to an Nth set of stereo images, the second request command corresponds to an (N+1)th set of stereo images, and the outputted image frame information corresponds to an (N−1)th set of image frame information of an (N−1)th set of stereo images, and the outputted updated image frame information corresponds to the Nth set of image frame information of an Nth set of stereo images.

3. The stereo image output method according to claim 1, wherein the memory stores a plurality of left-eye image frames and a plurality of right-eye image frames.

4. The stereo image output method according to claim 3, wherein the image synchronization operation comprises:
   selecting a left-eye image frame from the left-eye image frames and a right-eye image frame from the right-eye image frames according to a system clock to form a next set of stereo images; and
   updating the image frame information in the storage unit by utilizing information of the selected left-eye image frame and information of the selected right-eye image frame.

5. The stereo image output method according to claim 4, wherein the updated image frame information comprises memory addresses for storing the selected left-eye image frame and the selected right-eye image frame in the memory.

6. The stereo image output method according to claim 4, wherein the updated image frame information comprises resolutions of the selected left-eye image frame and the selected right-eye image frame.

7. A stereo image output apparatus, comprising:
   a storage unit;
   an image output unit, for providing a first request command at a first time point, and for providing a second request command at a second time point, wherein the first request command corresponds to a second set of stereo images, and the second request command corresponds to a third set of stereo images;
   an information transmission unit, for outputting image frame information comprising memory addresses from the storage unit in response to the first request command, triggering an image synchronization operation to update the image frame information in the storage unit according to the first request command, outputting the updated image frame information from the storage unit in response to the second request command, wherein the updated image frame information comprises memory addresses of the second set of stereo images stored in a memory; and
   an image synchronization unit, for performing the image synchronization operation;
   wherein, the image output unit outputs the first set of stereo images from a memory according to the outputted image frame information, and outputs the second set of stereo images from the memory according to the outputted updated image frame information.

8. The stereo image output apparatus according to claim 7, wherein the first request command corresponds to an Nth set of stereo images, the second request command corresponds to an (N+1)th set of stereo images, the outputted image frame information corresponds to an (N−1)th set of image frame information of an (N−1)th set of stereo images, and the outputted updated image frame information corresponds to the Nth set of image frame information of an Nth set of stereo image.

9. The stereo image output apparatus according to claim 6, wherein the memory stores a plurality of left-eye image frames and a plurality of right-eye image frames.

10. The stereo image output apparatus according to claim 9, wherein the image synchronization unit selects a left-eye image frame from the left-eye image frames and a right-eye image frame from the right-eye image frames according to a system clock to form a next set of stereo images, and updates the image frame information in the storage unit by utilizing information of the selected left-eye image frame and information of the selected right-eye image frame.

11. The stereo image output apparatus according to claim 10, wherein the updated image frame information comprises memory addresses for storing the selected left-eye image frame and the selected right-eye image frame in the memory.

12. The stereo image output apparatus according to claim 10, wherein the updated image frame information comprises resolutions of the selected left-eye image frame and the selected right-eye image frame.

13. The stereo image output apparatus according to claim 7, wherein the image synchronization unit and the information transmission unit are implemented by software.

* * * * *